US006968359B1

(12) United States Patent
Miller et al.

(10) Patent No.: US 6,968,359 B1
(45) Date of Patent: Nov. 22, 2005

(54) MERGE PROTOCOL FOR CLUSTERED COMPUTER SYSTEM

(75) Inventors: Robert Miller, Rochester, MN (US); Vicki Lynn Morey, Pine Island, MN (US); Kiswanto Thayib, Rochester, MN (US); Laurie Ann Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 09/638,328

(22) Filed: Aug. 14, 2000

(51) Int. Cl.$^7$ ............................ G06F 15/16; G06F 9/46
(52) U.S. Cl. ...................................... 709/205; 718/106
(58) Field of Search ................................ 709/230, 100, 709/102, 103, 104, 105, 106, 217, 219, 225, 709/201, 204, 205, 213, 215, 248; 714/15; 718/106

(56) References Cited

U.S. PATENT DOCUMENTS

| | | | | |
|---|---|---|---|---|
| 4,709,365 A | * | 11/1987 | Beale et al. | 714/4 |
| 5,146,590 A | * | 9/1992 | Lorie et al. | 707/7 |
| 5,179,699 A | * | 1/1993 | Iyer et al. | 707/7 |
| 5,502,818 A | * | 3/1996 | Lamberg | 709/225 |
| 5,528,605 A | | 6/1996 | Ywoskus et al. | |
| 5,563,878 A | | 10/1996 | Blakeley et al. | |
| 5,640,554 A | * | 6/1997 | Take | 707/7 |
| 5,704,032 A | | 12/1997 | Badovinatz et al. | |
| 5,729,687 A | * | 3/1998 | Rothrock et al. | 709/204 |
| 5,787,249 A | | 7/1998 | Badovinatz et al. | |
| 5,805,786 A | | 9/1998 | Badovinatz et al. | |
| 5,883,939 A | * | 3/1999 | Friedman et al. | 379/9 |
| 5,926,619 A | | 7/1999 | Badovinatz et al. | |
| 5,973,724 A | * | 10/1999 | Riddle | 348/14.07 |
| 6,006,259 A | * | 12/1999 | Adelman et al. | 709/223 |
| 6,065,062 A | | 5/2000 | Periasamy et al. | |
| 6,078,957 A | * | 6/2000 | Adelman et al. | 709/224 |
| 6,108,699 A | | 8/2000 | Moiin | |
| 6,115,749 A | | 9/2000 | Golestani et al. | |
| 6,138,251 A | | 10/2000 | Murphy et al. | |
| 6,185,666 B1 | * | 2/2001 | Murray et al. | 711/173 |
| 6,192,411 B1 | | 2/2001 | Chan et al. | |
| 6,216,150 B1 | * | 4/2001 | Badovinatz et al. | 718/106 |
| 6,292,905 B1 | | 9/2001 | Wallach et al. | |
| 6,298,041 B1 | | 10/2001 | Packer | |
| 6,317,867 B1 | * | 11/2001 | Elnozahy | 717/107 |

(Continued)

FOREIGN PATENT DOCUMENTS

JP      05-204811 A    8/1993

(Continued)

OTHER PUBLICATIONS

D. A. Agarwal et al, "A Reliable Ordered Delivery Protocol for Interconnected Local-Area Networks". In Proc. of the International Conference on Network Protocols, pp. 365-374, Tokyo, Japan, Nov. 1995.*

(Continued)

Primary Examiner—Marc D. Thompson
Assistant Examiner—Yemane M. Gerezgiher
(74) Attorney, Agent, or Firm—Wood, Herron & Evans, LLP

(57) ABSTRACT

An apparatus, program product and method utilize ordered messages in a clustered computer system to defer the execution of a merge protocol in a cluster group until all pending protocols in each partition of a group are handled, typically by ensuring either cancellation or completion of each pending protocol prior to execution of the merge protocol. From the perspective of each group member, the execution of the merge protocol is deferred by inhibiting processing of the merge request by such member until after processing of all earlier-received pending requests has been completed.

24 Claims, 2 Drawing Sheets

U.S. PATENT DOCUMENTS

| | | |
|---|---|---|
| 6,338,092 B1 | 1/2002 | Chao et al. |
| 6,343,320 B1 | 1/2002 | Faichild et al. |
| 6,363,495 B1 * | 3/2002 | MacKenzie et al. ........... 714/4 |
| 6,367,029 B1 | 4/2002 | Mayhead et al. |
| 6,381,215 B1 | 4/2002 | Hamilton et al. |
| 6,392,993 B1 | 5/2002 | Hamilton et al. |
| 6,408,310 B1 | 6/2002 | Hart |
| 6,425,014 B1 * | 7/2002 | Aiken et al. ................ 709/230 |
| 6,427,148 B1 * | 7/2002 | Cossock ........................ 707/7 |
| 6,446,219 B2 * | 9/2002 | Slaughter et al. ............. 714/14 |
| 6,449,641 B1 * | 9/2002 | Moiin et al. ................ 709/220 |
| 6,449,734 B1 * | 9/2002 | Shrivastava et al. .......... 714/15 |
| 6,453,426 B1 * | 9/2002 | Gamache et al. .............. 714/4 |
| 6,460,039 B1 * | 10/2002 | Pinter et al. ................... 707/10 |
| 6,496,481 B1 | 12/2002 | Wu et al. |
| 6,507,863 B2 * | 1/2003 | Novaes ....................... 709/201 |
| 6,529,958 B1 * | 3/2003 | Oba et al. .................... 709/237 |
| 6,545,981 B1 | 4/2003 | Garcia et al. |
| 6,564,372 B1 * | 5/2003 | Babaian et al. ............. 717/151 |
| 6,574,668 B1 | 6/2003 | Gubbi et al. |
| 6,578,032 B1 * | 6/2003 | Chandrasekar et al. ........ 707/6 |
| 6,611,923 B1 | 8/2003 | Mutalik et al. |
| 6,625,118 B1 | 9/2003 | Hadi Salim et al. |
| 6,625,639 B1 | 9/2003 | Miller et al. |
| 6,718,361 B1 | 4/2004 | Basani et al. |
| 6,757,698 B2 | 6/2004 | McBride et al. |
| 6,823,512 B1 | 11/2004 | Miller et al. |
| 6,839,752 B1 | 1/2005 | Miller et al. |
| 6,847,984 B1 | 1/2005 | Midgley et al. |
| 2002/0161889 A1 * | 10/2002 | Gamache et al. ........... 709/226 |
| 2002/0165977 A1 | 11/2002 | Novaes |
| 2003/0041138 A1 | 2/2003 | Kampe et al. |
| 2004/0153711 A1 * | 8/2004 | Brunelle et al. ................ 714/4 |

FOREIGN PATENT DOCUMENTS

| | | |
|---|---|---|
| JP | 07-311753 A | 11/1995 |
| JP | 09-245010 | 9/1997 |
| JP | 11-328136 | 11/1999 |
| JP | 2000-156706 A | 6/2000 |
| JP | 2000-196677 A | 7/2000 |

OTHER PUBLICATIONS

Wanlei Zhou et al, "Parallel Recovery in a Replicated Object Environment", 1996.*

Pei et al, "Totally Ordered Reliable Multicast for Whiteboard Application", Department of Computer Science and Technology, Tsinghua University, Beijing, 1999.*

Lilien, L., "Quasi-partitioning: a new paradigm for transaction execution in partitioned distributed Data base systems", Data Engineering, 1989. Proceedings. Fifth International Conference on, Feb. 6-10, 1989 Page(s): 546-553.*

Jing-Chiou Liou et al,"A comparison of general approaches to multiprocessor scheduling", Parallel Processing Symposium, 1997. Proceedings., 11th International, Apr. 1-5, 1997, Page(s): 152-156.*

A. Banerji, D et al, "High-Performance Distributed Shared Memory Substrate for Workstation Clusters", In Proc. of the Second IEEE Int'l Symp. on High Performance Distributed Computing, 1993.*

U.S. Appl. No. 09/697,398, entitled "Group Data Sharing During Membership Change in Clustered Computer System," filed on Oct. 27, 2000 by Miller et al. (ROC920000129US1).

U.S. Appl. No. 09/732,189, entitled "Peer Protocol Status Query in Clustered Computer System," filed on Dec. 7, 2000 by Miller (ROC920000125US1).

Timothy Roy Block, IBM Patent Application filed Nov. 22, 2000, U.S. Appl. No. 09/718,924, "Apparatus and Method for Communicating Between Computer Systems Using a Sliding Send Window for Ordered Messages in a Clustered Computing Environment."

Paul et al., "Reliable Multicast Transport (RMTP)," Apr. 1997, IEEE Journal of Selected Areas in Communications, vol. 15, No. 3, pp. 407-421.

* cited by examiner

MERGE PROTOCOL FOR CLUSTERED COMPUTER SYSTEM

FIELD OF THE INVENTION

The invention is generally directed to clustered computer systems, and in particular, to the handling of merge operations thereon.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group.

Clusters often support changes in group membership through the use of membership change protocols, e.g., if a member job needs to be added to or removed from a group. In some clustered systems, a membership change protocol is implemented as a type of peer protocol, where all members receive a message and each member is required to locally determine how to process the protocol and return an acknowledgment indicating whether the message was successfully processed by that member. Typically, with a peer protocol, members are prohibited from proceeding on with other work until acknowledgments from all members have been received. In other systems, membership change protocols may be handled as master-slave protocols, where one of the members is elected as a leader, and controls the other members so as to ensure proper handling of the protocol.

One particular type of membership change operation that may be implemented in a clustered computer system is a merge, which is required after a group has been partitioned due to a communication loss in the cluster. In particular, a communication loss in a cluster may prevent one or more nodes from communicating with other nodes in the cluster. As such, whenever different member jobs in a group are disposed on different nodes between which communication has been lost, multiple, yet independent instances of the group (referred to as "partitions") may be formed in the cluster. A merge is therefore used after communication has been reestablished to merge the partitions back together into a single group.

As with communication losses, merges are typically asynchronous with respect to a group—i.e., a merge can occur at any given time. However, even when a group is partitioned due to a communication loss, each partition may still perform useful work. Moreover, a partition typically assumes that, unlike in a node failure instance, any members that have "left" the partition as a result of the partitioning are still active, and are performing useful work. As a consequence, it is necessary whenever a merge occurs to ensure that any ongoing work within a partition is handled in an appropriate manner, and moreover, that ongoing work being performed by multiple partitions is consistent, so that all of the members of the group are "synchronized" with one another upon completion of the merge. Otherwise, conflicts or inconsistencies between different members could occur, resulting in system errors, data corruption, or even system failure.

Given the asynchronous nature of merge operations, conventional clustered computer systems handle such operations immediately upon receipt of a merge request, in an attempt to ensure the merge occurs as quickly as possible to reestablish the original group organization. However, doing so may introduce indeterminate actions, since any ongoing protocols at the time of a merge will be completed after the merge has been processed, and thus after the membership seen by a requesting member has changed.

In addition, conventional clustered computer systems typically utilize master-slave-type protocols to handle merge operations. Master-slave-type protocols, however, are significantly limited in many respects. First, master-slave protocols are susceptible to failure of a leader or master. Second, master-slave protocols often require a centralized data structure to be used in performing a merge, which requires additional communication between nodes, and which can be significantly limited with respect to geographically-dispersed nodes.

Therefore, a significant need exists in the art for an improved manner of handling merge operations to join multiple partitions in a clustered computer system.

SUMMARY OF THE INVENTION

The invention addresses these and other problems associated with the prior art in providing an apparatus, program product and method in which ordered messages are used to defer the execution of a merge protocol in a group until all pending protocols in each partition of a group are handled, typically by ensuring either cancellation or completion of each pending protocol prior to execution of the merge protocol. From the perspective of each group member, the execution of the merge protocol is deferred by inhibiting processing of the merge request by such member until after processing of all earlier-received pending requests has been completed.

As such, in contrast to conventional clustered computer systems in which merge protocols are handled outside of the normal ordering of protocols within a cluster, merge protocols are ordered along with other protocols. Doing so significantly simplifies the synchronization of the partitions since each group member is able to determine whether a pending protocol was requested either before or after a pending merge protocol, and handle the pending protocol accordingly (based upon the knowledge of which members are present in the partition/group before and after the merge). Moreover, doing so facilitates the use of a peer-type merge protocol, thereby eliminating the need to rely on a master or a central data structure to perform partition synchronization.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
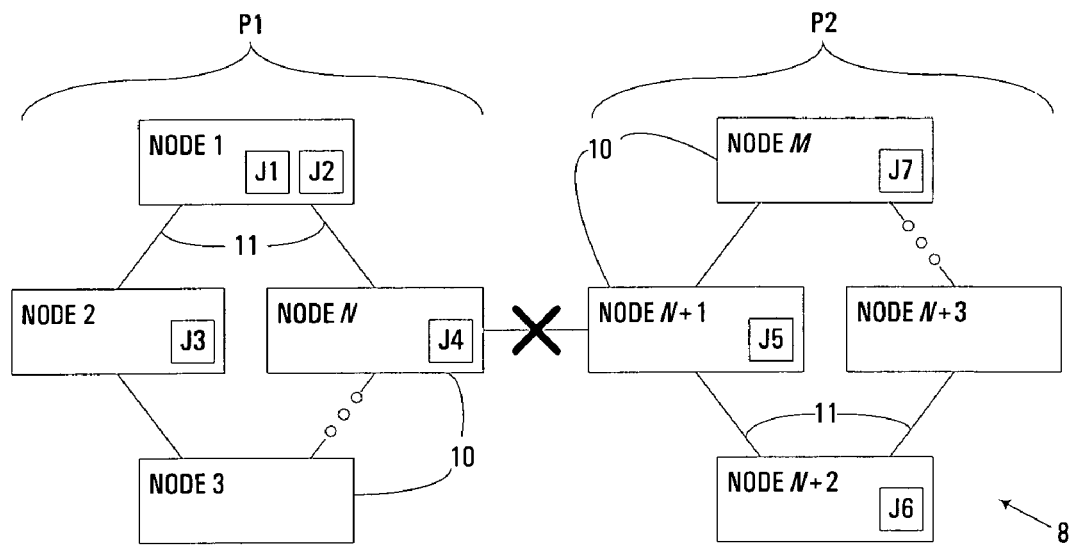
FIG. 1 is a block diagram of a clustered computer system consistent with the invention, illustrating an exemplary communication loss and partitioning of the clustered computer system.

The embodiments described hereinafter utilize ordered messages to process merge requests in a clustered computer environment, e.g., to merge multiple partitions of a cluster group logically resident in one or more nodes of a clustered computer system. As shown in FIG. 1, for example, a clustered computer system 8 may include a plurality of nodes 10 interconnected with one another via a network of interconnections 11. Any number of network topologies commonly utilized in clustered computer systems may be used consistent with the invention. Moreover, individual nodes 10 may be physically located in close proximity with other nodes, or may be geographically separated from other nodes, e.g., over a wide area network (WAN), as is well known in the art.

In the context of a clustered computer system, at least some computer tasks are performed cooperatively by multiple nodes executing cooperative computer processes (referred to herein as "jobs") that are capable of communicating with one another. Such cooperative jobs are logically organized into a "group", with each cooperative job being designated as a "member" of the group. Group members, however, need not necessarily operate on a common task—typically all that is required for members of a group is that such members be capable of communicating with one another during execution.

FIG. 1, for example, illustrates an exemplary cluster of nodes 10, also denoted herein for purposes of example by the sequential identifiers 1, 2, 3 . . . N, N+1, N+2, N+3 . . . M (where M>N). Resident within various nodes are a plurality of jobs J1–J7 forming the members of an exemplary group in the clustered computer system. As shown in this figure, nodes in a clustered computer system are not required to participate in all groups (e.g., node 3). Moreover, multiple jobs from a given group may be resident in the same node (e.g., jobs J1 and J2 in node 1).

In the illustrated embodiments, member jobs communicate with one another through the use of ordered messages. A portion of such messages are referred to herein as "requests," which are used to initiate "protocols" in response to activation by a user (e.g., an application or other computer process executing on one or more nodes in the clustered computer system). A protocol is a unit of work that all members of a group are required to handle. Typically, in response to a protocol request, each member is also required to return an acknowledgment message to indicate success or failure of a particular protocol by that member. Moreover, typically no member is permitted to continue until acknowledgment messages have been received from all group members, and if a member failure occurs, the failure is translated into an acknowledgment message to prevent the protocol from hanging.

Membership in a group need not be static, and many clustered computer systems support the ability to add/join or remove members to or from a group. Typically, a change in membership of a group is handled via a particular protocol referred to as a membership change protocol, and is handled through the use of a membership change request message forwarded to all members of a group.

As discussed above, one phenomenon that may occur during execution of a clustered computer system is a communication loss that severs the ability for the jobs in a group from communicating with one another, which results in the group becoming partitioned into two or more partitions, or independent instances of the same group. As an example, with the group formed by jobs J1–J7 of FIG. 1, should a communication loss occur between nodes N and N+1, two partitions P1 and P2 would be created, with partition P1 incorporating jobs J1–J4 and partition P2 incorporating jobs J5–J7.

Whenever communication is reestablished, it is possible to recombine partitions through the use of a merge protocol, initiated via a merge request in the illustrated embodiments. A merge request is forwarded to all members of each partition to be combined, and each member responds via a suitable acknowledgment message. A merge protocol may be initiated asynchronously with respect to a group, so such a protocol may be initiated at any time during the execution of other protocols. Given, however, that the members in each partition are capable of processing different protocols when a merge occurs, it is important that the progress of such protocols be handled in an appropriate manner to ensure coherency among the group members once the merge protocol is complete.

For example, it is typically necessary to ensure that, if a protocol is executing in one partition when a merge occurs, the messages associated with the protocol must be distinguished from messages for other protocols in other partitions. Also, it is necessary to handle protocol requests that are pending in one partition but not another prior to a merge.

It is also necessary to synchronize partitions after a merge so that all of the partitions work on the same protocols.

The illustrated embodiments of the invention attempt to provide such coherency by ensuring that the processing of any protocol requests initiated prior to a merge protocol is completed prior to processing the merge protocol. The illustrated embodiments in part rely on ordered messaging, whereby each protocol request is assigned a reception identifier (e.g., a numerical value or other suitable indicator of sequence) that indicates the order of reception of such request relative to other received requests. Other messages, such as acknowledgment messages, are not assigned request identifiers in the illustrated embodiments, however, such messages are typically assigned a request handle that identifies the particular request to which such messages are responsive. A merge request therefore functions as a sync point after which any request will be considered to have been sent to all group members.

Previously-pending protocol requests are processed prior to processing of a merge protocol request by either canceling or finishing the protocol with which such requests are associated. In the illustrated embodiments, any pending protocol requests for which execution has not yet begun as of reception of a merge protocol request are canceled, and any pending protocol requests for which execution has begun are allowed to complete prior to processing or performing the merge.

It will be appreciated that nomenclature other than that specifically used herein to describe the handling of computer tasks by a clustered computer system may be used in other environments. Therefore, the invention should not be limited to the particular nomenclature used herein, e.g., as to protocols, requests, messages, jobs, merges, partitions, etc.

Figure 2:
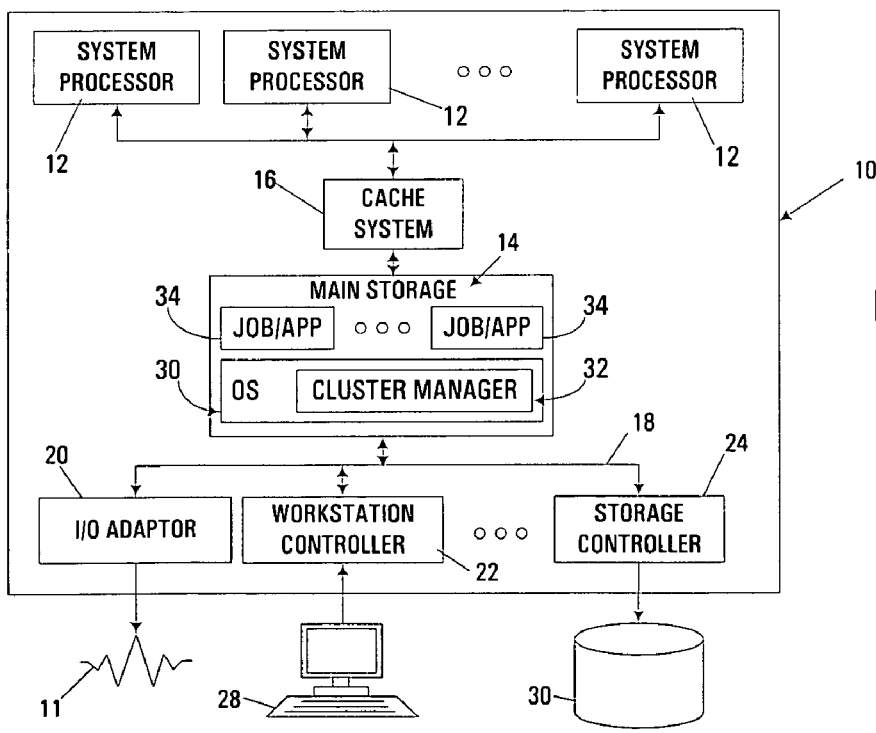
FIG. 2 is a block diagram of a node in the clustered computer system of FIG. 1.

Now turning to FIG. 2, an exemplary hardware configuration for one of the nodes 10 in clustered computer system 8 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network 11), one or more workstations 28, and/or one or more storage devices such as a direct access storage device (DASD) 30. Any number of alternate computer architectures may be used in the alternative.

To implement merge protocol processing consistent with the invention, job-specific message processing functionality may be implemented within cluster management software implemented in each node. For example, node 10 is illustrated as having resident in main storage 14 an operating system 30 implementing a cluster manager program 32 for implementing merge protocol processing consistent with the invention. One or more jobs or applications 34 are also illustrated, each having access to clustering functionality implemented within cluster manager program 32. It will be appreciated, however, that the functionality described herein may be implemented in other layers of software in node 10, and that the functionality may be allocated among other programs, computers or components in clustered computer system 8. Therefore, the invention is not limited to the specific software implementation described herein.

The discussion hereinafter will focus on the specific routines utilized to implement the above-described merge protocol processing functionality. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 3:
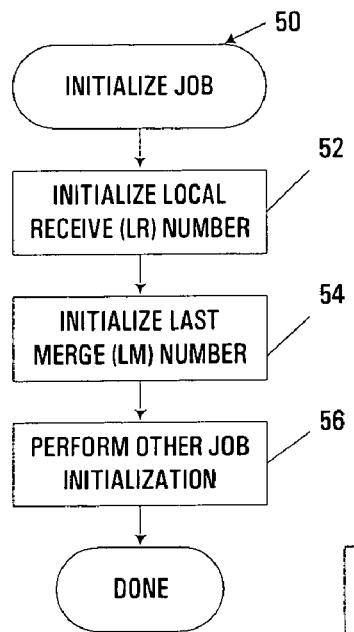
FIG. 3 is a flowchart illustrating the program flow of an initialize job routine performed by a group member in the clustered computer system of FIG. 1.
Figure 4:
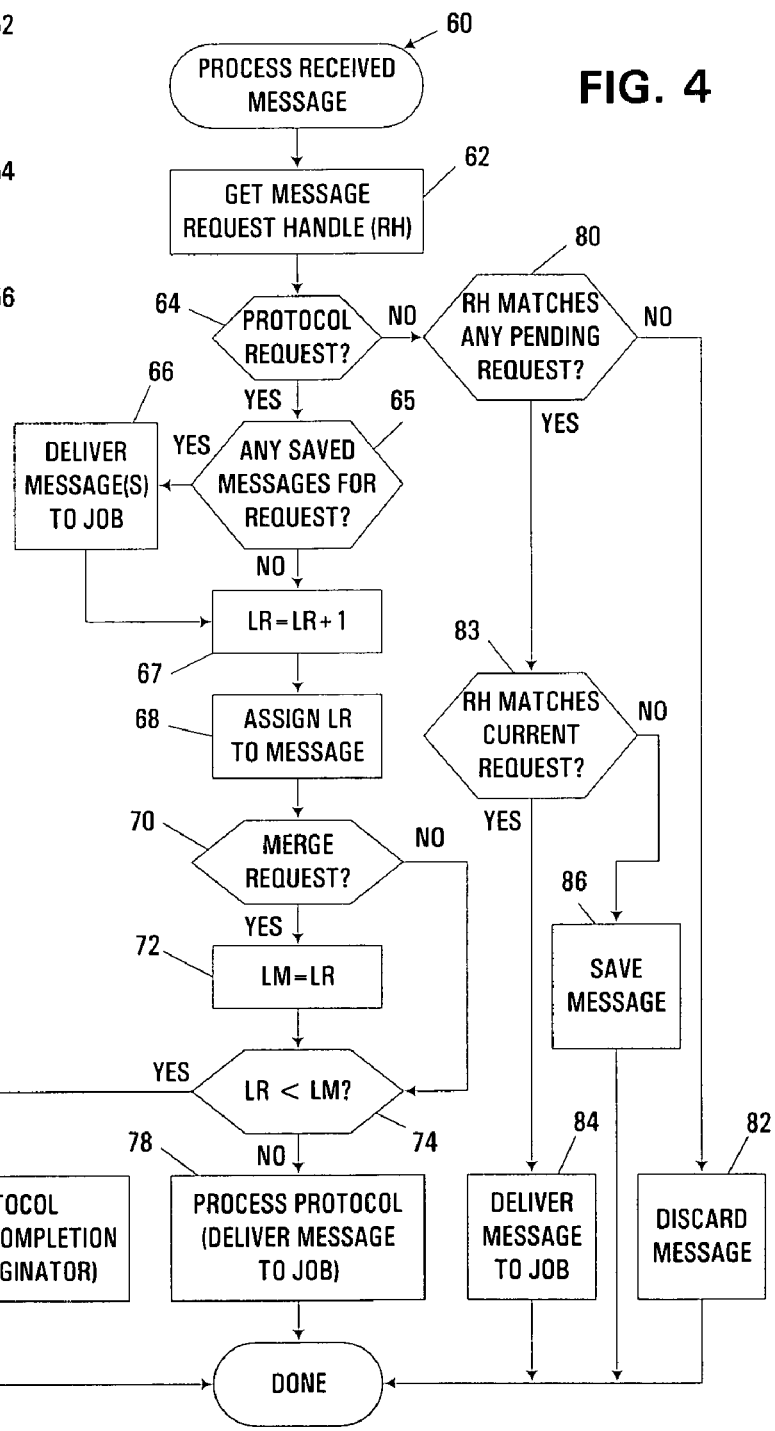
FIG. 4 is a flowchart illustrating the program flow of a process received message routine performed by a group member in the clustered computer system of FIG. 1.

FIGS. 3 and 4 respectively illustrate an initialize job routine 50 and a process received message routine 60 suitable for execution by group members, with merge protocol processing functionality implemented therein. Initialize job routine 50 of FIG. 3 is called whenever a job is created on a node. The bulk of the functionality in routine 50 is unrelated to merge protocol processing, however, it is also within this routine that a pair of variables relevant to merge protocol processing are initialized. Specifically, block 52 initializes a local receive (LR) number variable for the job, which is used to assign sequential reception identifier to requests received by the job. Block 54 initializes a last merge (LM) number variable, which represents the reception identifier of the last (most-recently-received) merge request received by the job. Each variable is initialized, for example, to a value of zero. Block 56 then performs other job initialization operations, typically in a conventional manner, whereby routine 50 is then complete.

Process received message routine 60 of FIG. 4 is executed upon reception of a new message by a job, typically as a result of an ordered-messaging service placing the message on a queue. Routine 60 begins in block 62 by obtaining the message request handle (RH) for the received message. As discussed above, the request handle for a message uniquely identifies a protocol, so that requests and acknowledgments or other responses thereto can be matched up with one another.

Next, block 64 determines whether the received message is a protocol request, as opposed to an acknowledgment or other response to a previously-received protocol request. If so, control passes to block 65 to determine whether any saved messages exist for the received request. As discussed below, a message such as an acknowledgment may be received for a pending (but not yet processed) request, and it is when such a pending request is processed that the saved messages associated therewith may be delivered to the job. Therefore, in such a circumstance, block 65 passes control to block 66 to deliver any such saved messages to the job.

Once the saved messages are delivered to the job (of if no saved messages exist), control passes to block 67 to increment the local receive number variable to generate a reception identifier for the current request message that is sequentially subsequent to earlier-received requests (e.g., using any number of monotonically-increasing sequences). Next, block 68 assigns the current value of the local receive number variable to the request message, thereby associating the reception identifier with the request message.

Next, block 70 determines whether the request message is a merge request. If so, control passes to block 72 to set the last merge number variable to equal the reception identifier of the request message—that is, the current value of the local receive number variable. Control then passes to block 74 to determine whether the reception identifier for the current request message (represented by the current value of the local receive number variable) is less than that of the last-received merge request (represented by the current value of the last merge number variable). Also, returning to block 70, if the request message is not a merge request, block 72 is bypassed, and control passes directly to block 74.

If the reception identifier for the current request message is less than that of the last-received merge request (indicating that a merge has occurred), control passes from block 74 to block 76 to perform merge protocol processing. In the illustrated embodiment, merge protocol processing incorporates canceling the protocol represented by the current request message, typically by returning a reply to the originating entity for the protocol indicating that the request was canceled due to a merge. The originating entity, once being notified that the request was canceled, may then (if desired) reissue the request to retry the protocol. When a merge request is processed, each member is updated with the membership for all other partitions. As such, any future protocols, including reissued protocols, will require responses from all members, not just partition members.

Returning to block 74, if the reception identifier for the current request message is greater than that of the last-received merge request (indicating that no merge has occurred since the request was received), control simply passes to block 78 to continue processing the protocol in a conventional manner, typically by delivering the message to the job for further processing. It should also be noted that, if the current request message is a merge request, the local receive number for the current request message will be the same as the last merge number, so block 74 will also pass control to block 78 to continue processing of the merge request by delivering the message to the job. Processing of the received request is then complete.

Returning to block 64, if the received message is not a protocol request, control passes to block 80 to determine whether the request handle for the message matches that of any pending request—that is, whether the received message is an acknowledgment or other response to a protocol that is pending or currently in progress. If not, control passes to block 82 to simply discard the message and complete processing of the received message. Alternatively, the message could be saved for later processing.

If the request handle of the received message does match that of a pending request, however, block 80 passes control to block 83 to determine whether the request handle of the received message matches that of the current request. If so, control passes to block 84 to deliver the message to the job, thereby permitting the protocol to complete. On the other hand, if the message is for a pending (but not current) request, block 83 passes control to block 86 to save the message for later playback. Processing of the message is then complete, and routine 60 terminates.

It will be appreciated therefore that the merge protocol processing in routine 60 essentially cancels all requests up to the time of a merge, except for those that were already executing when the merge occurred. Requests received after the merge are assumed to have been sent to all members, so such requests are not canceled.

It will also be appreciated that the aforementioned routines presuppose a peer-type merge protocol, and it is assumed that all members of a group participate in any protocol. Thus, if a merge occurs during a protocol, it is desirable to inhibit members from other partitions from participating in the protocol. By deferring processing of the merge request, therefore, those new members are not recognized until after all pending protocols (including any that are currently executing) are complete (e.g., either finished or canceled). Also, due to the peer protocol nature, each member is able to locally determine if a particular request should be invoked or canceled. However, it should be appreciated that the invention may also be implemented in a master-slave protocol environment consistent with the invention.

It may also be desirable to save messages for future protocols so that such messages can be replayed when such protocols are later processed. Such a situation could occur, for example, if one partition is executing a pre-merge protocol, but another partition has started to execute the merge protocol immediately (e.g., if the partition had no pending requests). It is desirable to keep and replay all messages from the merge protocol when a partition is ready to start the merge. A future protocol may be detected by scanning the request handles of pending requests. Messages for past protocols (i.e., protocols other than a current protocol or a future protocol) are discarded, and are detected if the message request handle does not match a pending or future request handle (i.e., the request had been sent from another partition before the merge).

By way of example, assume partitions P1 and P2 of FIG. 1 respectively receive the following request messages in the specified order:

P1: R11, R12, R3 . . . R1$x$ M R3
P2: R21, R22, R23 . . . R2$y$ M R3 where M is a merge request. Thus, requests R11 to R1$x$ and R21 to R2$y$ are received by the respective partitions prior to the merge request, and request R3 is received by both partitions after the merge request.

Also assume for the purposes of example that partition P1 is executing request R11 and partition P2 is executing request R21 when merge request M is received. M modifies the last merge number. Furthermore, requests R12–R1$x$ and R22–R2$y$ have local receive numbers less than the last merge number.

Since requests R11 and R21 have different request handles, their messages are not received by any other protocol. Further, since M has not yet been processed, neither P1 nor P2 know about the merge yet at the protocol level (though the cluster manager communication mechanism does consider them merged). Based upon the above-described functionality in routine 60, requests R11 and R21 will be allowed to complete. Then, when request R12 is ready to be processed by partition P1, its local receive number will be less than the last merge number, so the request will be canceled. Like actions occur for requests R13–R1x and R22–R2y. The merge will be processed and then request R3 will be processed on all members of the merged group.

If, for example, partition P1 starts executing the merge request M while partition P2 is still executing request R21, partition P1 members may send acknowledgment messages to the merge request to partition P2. However, each member in partition P2 will scan its list of pending requests, and find that the acknowledgment messages match the request handle for merge request M. As a result, each member in partition P2 will save the messages and reply to such messages when merge request M is processed in partition P2.

When merge request M is finally processed, all partitions will be synced up. Processing of the merge request M updates the membership that all future protocols see, so such protocols include all members from all partitions. An ack round is used, so all members will wait until all members have sent acknowledgment messages and received acknowledgment messages from all other members before proceeding. The merged group is thus synced up. Request R3 can then be processed on the merged group. Its local receive number will be greater than the last merge number, so the protocol will be executed on all group members.

While the above-described functionality may be implemented in a wide variety of clustered computer systems, one possible application of the invention is in an AS/400-based clustered computer system such as is available from International Business Machines Corporation. In such an implementation, requests may be held in request queues within the Machine Interface (MI) layer of each node, and dequeued when such requests are ready to be processed. Request handles may be implemented as universally unique identifiers (UUID's), assigned when a request is sent to a group.

Various modifications will be apparent to one of ordinary skill in the art. Therefore, the invention lies in the claims hereinafter appended.

What is claimed is:

1. A method of processing a merge request received by a member of a group in a clustered computer system, the method comprising:
   (a) receiving a merge request in the member, the merge request configured to initiate a recombination of a plurality of partitions of the group in the clustered computer system; and
   (b) inhibiting processing of the merge request by the member until after processing of all earlier-received pending requests by the member is completed.

2. A method of processing a merge request received by a member of a group in a clustered computer system, the method comprising:
   (a) receiving a merge request in the member,
   (b) inhibiting processing of the merge request by the member until after processing of all earlier-received pending requests by the member is completed;
   (c) assigning a reception identifier to each request received by the member to indicate a relative order of reception of each received request by the member, including assigning a reception identifier to the merge request indicating reception of the merge request after reception of all earlier-received pending requests received by the member; and
   (d) processing each received request in order according to the reception identifiers assigned thereto, wherein inhibiting processing of the merge request comprises processing the merge request after completing processing of each earlier-received pending request.

3. The method of claim 2, wherein processing each received request includes, for each received request:
   (a) comparing the reception identifier assigned to such received request with a reception identifier for a last received merge request; and
   (b) canceling such received request if the reception identifier assigned to such received request indicates earlier reception of such received request relative to the reception identifier for the last received merge request.

4. The method of claim 3, wherein comparing the reception identifier assigned to such received request with the reception identifier for the last received merge request includes comparing the reception identifier assigned to such received request with a stored last merge reception identifier, the method further comprising, in response to reception of the merge request, updating the stored last merge reception identifier to that of the merge request.

5. The method of claim 3, wherein canceling such received request includes returning a cancel completion message to an originator of such received request.

6. The method of claim 3, wherein processing each received request further includes, for each received request, executing a protocol associated with such received request if the reception identifier assigned to such received request does not indicate earlier reception of such received request relative to the reception identifier for the last received merge request.

7. A method of processing a merge request received by a member of a group in a clustered computer system, the method comprising:
   (a) receiving a merge request in the member;
   (b) inhibiting processing of the merge request by the member until after processing of all earlier-received pending requests by the member is completed;
   (c) receiving a message other than a request;
   (d) determining whether a request handle associated with the message matches that of a pending request for the member; and
   (e) discarding the message if the request handle does not match that of a pending request for the member.

8. The method of claim 1, further comprising
   (a) receiving the merge request in a plurality of additional members in the group; and
   (b) locally inhibiting processing of the merge request within each of the plurality of additional members until after processing of all earlier-received pending requests by each such member is completed.

9. A method of processing a request received by a member of a group in a clustered computer system, the method comprising:
   (a) assigning a reception identifier to a received request, the reception identifier indicating a relative order of reception of the received request;
   (b) comparing the reception identifier assigned to the received request with a reception identifier for a last received merge request; and (c) canceling the received request if the reception identifier assigned to the received request indicates earlier reception of the received request relative to the reception identifier for the last received merge request.

10. The method of claim 9, wherein comparing the reception identifier assigned to the received request with the reception identifier for the last received merge request includes comparing the reception identifier assigned to the received request with a stored last merge reception identifier, the method further comprising:
(a) determining whether the received request is a merge request; and
(b) if so, updating the stored last merge reception identifier to that of the merge request.

11. The method of claim 9, wherein canceling the received request includes returning a cancel completion message to an originator of the received request.

12. The method of claim 9, further comprising executing a protocol associated with the received request if the reception identifier assigned to the received request does not indicate earlier reception of the received request relative to the reception identifier for the last received merge request.

13. The method of claim 9, further comprising:
(a) receiving a message other than a request;
(b) determining whether a request handle associated with the message matches that of a pending request for the member; and
(c) discarding the message if the request handle does not match that of a pending request for the member.

14. An apparatus, comprising:
(a) a memory; and
(b) a program resident in the memory, the program configured to process a merge request received by a member of a group in a clustered computer system by inhibiting processing of the merge request until after processing of all earlier-received pending requests is completed, wherein the merge request is configured to initiate a recombination of a plurality of partitions of the group in the clustered computer system.

15. An apparatus, comprising:
(a) a memory; and
(b) a program resident in the memory, the program configured to process a merge request received by a member of a group in a clustered computer system by inhibiting processing of the merge request until after processing of all earlier-received pending requests is completed, wherein the program is further configured to assign a reception identifier to each request received by the member to indicate a relative order of reception of each received request by the member, wherein a reception identifier is assigned to the merge request indicating reception of the merge request after reception of all earlier-received pending requests received by the member, and wherein the program is further configured to process each received request in order according to the reception identifiers assigned thereto such that the program inhibits processing of the merge request by processing the merge request after completing processing of each earlier-received pending request.

16. The apparatus of claim 15, wherein the program is configured to process each received request by comparing the reception identifier assigned to such received request with a reception identifier for a last received merge request, and canceling such received request if the reception identifier assigned to such received request indicates earlier reception of such received request relative to the reception identifier for the last received merge request.

17. The apparatus of claim 16, wherein the program is configured to compare the reception identifier assigned to such received request with the reception identifier for the last received merge request by comparing the reception identifier assigned to such received request with a stored last merge reception identifier, and wherein the program is further configured to update the stored last merge reception identifier to that of the merge request in response to reception of the merge request.

18. The apparatus of claim 16, wherein the program is configured to cancel such received request by returning a cancel completion message to an originator of such received request.

19. The apparatus of claim 16, wherein the program is configured to process each received request further by, for each received request, executing a protocol associated with such received request if the reception identifier assigned to such received request does not indicate earlier reception of such received request relative to the reception identifier for the last received merge request.

20. An apparatus, comprising:
(a) a memory; and
(b) a program resident in the memory, the program configured to process a merge request received by a member of a group in a clustered computer system by inhibiting processing of the merge request until after processing of all earlier-received pending requests is completed, wherein the program is further configured to receive a message other than a request, determine whether a request handle associated with the message matches that of a pending request for the member, and discard the message if the request handle does not match that of a pending request for the member.

21. The apparatus of claim 14, wherein the program is further configured to receive the merge request in a plurality of additional members in the group, and locally inhibit processing of the merge request within each of the plurality of additional members until after processing of all earlier-received pending requests by each such member is completed.

22. The apparatus of claim 14, wherein the apparatus is a computer in the clustered computer system.

23. A clustered computer system, comprising:
(a) a plurality of nodes coupled to one another over a network;
(b) a plurality of member jobs defining a group and configured to be executed by at least one of the plurality of nodes; and
(c) a program configured to be executed by at least one of the plurality of nodes to process a merge request received by a member job from the plurality of member jobs by inhibiting processing of the merge request until after processing of all earlier-received pending requests is completed, wherein the merge request is configured to initiate a recombination of a plurality of partitions of the group in the clustered computer system.

24. A program product, comprising:
(a) a program configured to process a merge request received by a member of a group in a clustered computer system by inhibiting processing of the merge request until after processing of all earlier-received pending requests is completed, wherein the merge request is configured to initiate a recombination of a plurality of partitions of the group in the clustered computer system; and
(b) a computer readable medium upon which the program is tangibly embodied.

* * * * *